C. M. T. 'Du MOTAY.
Manufacture of Iron and Steel.
No. 150,546.          Patented May 5, 1874.
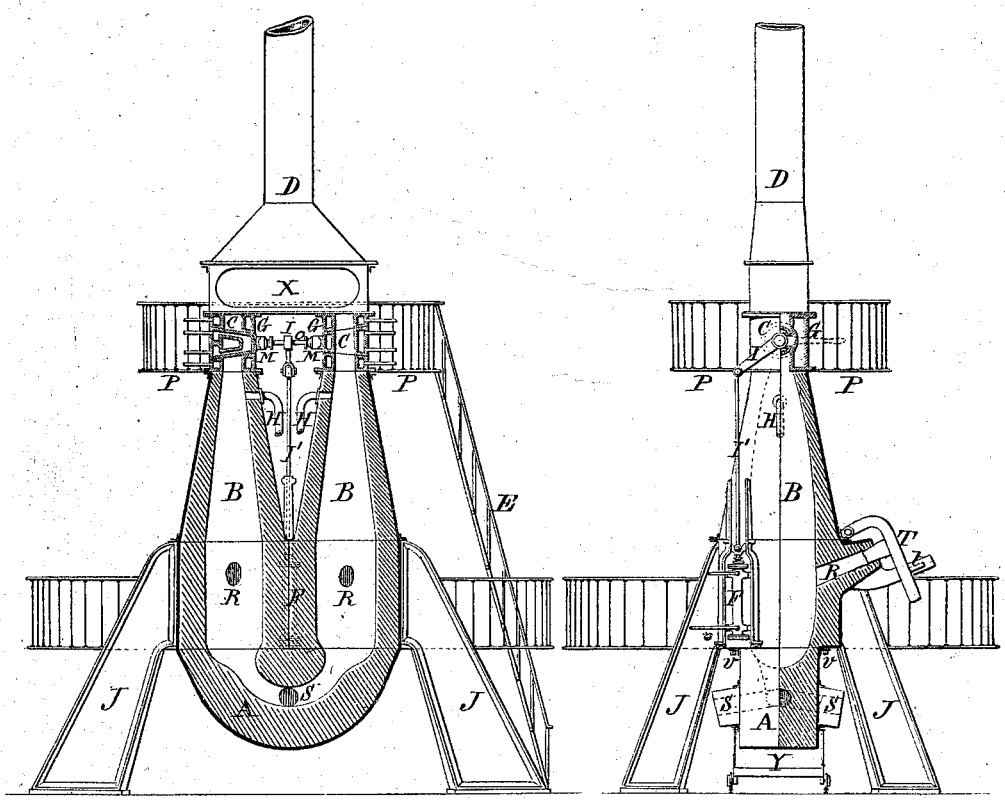

UNITED STATES PATENT OFFICE.

CYPRIEN MARIE TESSIÉ DU MOTAY, OF PARIS, FRANCE, ASSIGNOR TO EDWARD STERN, OF NEW YORK, N. Y.

IMPROVEMENT IN THE MANUFACTURE OF IRON AND STEEL.

Specification forming part of Letters Patent No. 150,546, dated May 5, 1874; application filed November 6, 1873.

*To all whom it may concern:*

Be it known that I, CYPRIEN MARIE TESSIÉ DU MOTAY, of Paris, France, have invented certain Improvements in the Manufacture of Iron and Steel, and apparatus therefor, of which the following is a specification:

This invention relates to a new process for the manufacture of iron and steel, by means of which the ores of iron or pig, cast or old iron, containing phosphorus, sulphur, silicium, and arsenic, may be purified and utilized.

Heretofore these varieties of iron have not, in the Bessemer or similar apparatus, or in reverberatory or other furnaces, been capable of transformation into malleable steel suitable to be rolled. My invention consists, first, in an improved alloy of iron and phosphorus, by means of which I produce a new material, containing very little or no "active" carbon, which I call "phosphoric steel;" second, in an improved alloy of iron, phosphorus, and manganese, as will be hereinafter set forth; third, in the process of converting the various ores and varieties of iron containing a minimum quantity of phosphorus into phosphoric iron or steel; fourth, in the process of converting the varieties of iron and ores containing a maximum quantity of phosphorus into phosphoric steel by the introduction of manganese during the process of melting; fifth, in the employment of certain reagents, hereinafter specified, for the formation of a flux to absorb and combine with the silicium, sulphur, &c., and remove the same and other impurities from the metal; sixth, in a new and improved apparatus for carrying my invention into effect, which I call an aerodynamic purifier, as will be more fully hereinafter described.

The reagents which I employ operate on one hand to wholly eliminate the sulphur, arsenic, and silicium contained in the ores or iron to be transformed into phosphoric steel, and on the other hand to eliminate a portion of the phosphorus and convert the metal directly into the phosphoric steel, if the amount of phosphorus in the metal does not exceed from two-thousandths to five-thousandths; or into an alloy containing four-thousandths of phosphorus, if the proportion of phosphorus in the metal to be refined should exceed five-thousandths, which alloy is utilized in the manufacture of phosphoric steel by a subsequent process, as will be described.

When the metals to be purified do not contain more than five-thousandths of phosphorus, I can submit them as they are, without the addition of manganese, to the oxidizing action of compressed air, and of the purifying agents hereinafter specified. If the proportion of phosphorus exceed five-thousandths, according to the nature of the minerals from which the metals are extracted, then, during the melting of the iron in the blast-furnace, I mix with it a quantity of manganese, equal at the minimum to two and a half per cent. of the weight of the said iron, which will eliminate any silicium and sulphur, and reduce the amount of phosphorus to such an extent that the metal can be subsequently transformed into the phosphoric steel.

In case the irons to be purified cannot be prepared, as above stated, in the blast-furnace, I transform them into "fine metal" in the aerodynamic apparatus, and add, in the form of melted spiegeleisen, two per cent. of manganese. This combination, subsequently treated in a puddling-furnace, will give an iron free from silicium and sulphur, and almost free from phosphorus and arsenic. This almost chemically pure iron I remelt in a reverberatory furnace, with crude metal, or the metal containing more than four-thousandths of phosphorus, in such proportion that the phosphorus in the whole mass of molten metal will be in about the proportion of two-thousandths, which will produce "ternary" steel specially adapted to the manufacture of the strongest rails.

The chemical purifying agents hereinafter described are constantly passed through the molten metal or ores in the aerodynamic apparatus, and are constantly stirred with the same while in a state of fusion by the action of the air. These reagents constitute true fluxes, fusible at a medium temperature, which will mix with the silicates and metallic oxides formed by the oxidation of the sulphur, silicium, &c. Their effect is to take up the oxidized silicium, sulphur, &c., and combine them with some base upon which the molten metal cannot produce any reductive action.

The reagents which I employ are, first, calcic oxyfluoride mixed with equal parts of lime and fluoride of calcium; second, chloride of sodium and hypochloride of lime, mixed in equal parts; third, the alkaline nitrates or earthy alkalies. These reagents, employed separately, have upon the metals to be purified but an incomplete action; but, if fused together, or simply mixed in the proportions hereinafter described, they act with great efficiency.

The following reagents, mixed in about the proportions as indicated, I have found to act well, viz: calcic oxyfluoride, one part; chloride of sodium and hypochloride of lime, one part; alkaline nitrates, three parts. Of this composition I can, according to the nature of the metals to be purified, take variable quantities; but whatever may be the proportions of phosphorus and arsenic contained in the said metals, I have found by experiment that it is sufficient to employ fifty kilograms of the said mixture to bring the "crude" metal produced with one ton of iron containing fifteen kilograms of phosphorus (as an example) to a state in which it will contain three kilograms, so that the crude metal can afterward be transformed into excellent ternary steel in a reverberatory furnace.

I make use of a reverberatory furnace in the ordinary manner, to complete the refining of the crude metal produced in the aerodynamic apparatus.

The metals combined with phosphorus and arsenic, as well as those which contain silicium, sulphur, and phosphorus, cannot be completely transformed into malleable steel in my aerodynamic apparatus, because the employment of reagents in a great part volatile causes a gradual cooling of the metallic mass, which becomes less and less fluid toward the end of the operation. Experience has demonstrated to me that the purified metal should be poured at the moment when it passes from the state of "fine" metal, or iron, to the state of crude metal, or steel.

The crude metal thus obtained is easily refined. After cooling, it can be remelted in a reverberatory furnace in the same manner as in the Martin Siemens process. By the oxidizing action of the flame, in connection with the oxides of iron or manganese employed in successive parts, the crude metal is rapidly transformed, first into carbon steel, then into "phosphoric" iron, or steel containing little or no carbon capable of being taken up by the action of the agents of oxidation and reduction combined.

Manganese may be substituted for the carbon thus expelled by employing an alloy called ferro-manganese, containing at a medium sixty parts of iron and forty parts of manganese. This is added to the purified metal while in a state of fusion.

It is well known that iron containing phosphorus furnishes a steel with carbon and manganese, brittle when cold and impossible to roll when hot. It is similar in this respect to the Bessemer metal, which, when it contains one-thousandth of phosphorus, is unfit for the manufacture of rails. In one word, quarternary steel containing iron, manganese, carbon, and phosphorus obtained in a reverberatory furnace cannot be welded or rolled.

Instead of the spiegeleisen, before mentioned, I sometimes employ an artificial compound of iron and manganese for combining with the decarbureted metal. I usually employ for this purpose twenty kilograms of ferro-manganese, containing sixty parts of iron and forty parts of manganese. These quantities, added to one thousand kilograms of decarbureted metal, produce the desired effect. The combination of the ferro-manganese can be effected by following the details either in the Bessemer apparatus, in the Siemens furnace, or in any other apparatus in use for the transformation of cast-iron or ores into wrought-iron or steel.

The ternary steel, consisting of iron, phosphorus, and manganese, thus manufactured, possesses many appreciable qualities. It is capable of being worked hot and cold; it presents a great resistance to concussions and efforts of bending. In fact, it will stand all tests to which ternary steels, with carbon, are usually subjected.

My invention may be applied to all iron ores or scraps containing phosphorus, which may be wrought in a reverberatory furnace to the condition of an alloy containing a proportion of phosphorus, varying from two-thousandths to four-thousandths, and combined with manganese after decarbonization by the process herein described.

Having fully described the process of treating the metals and ores for the manufacture of phosphoric steel, I will proceed to describe the aerodynamic apparatus which I use for purifying and converting the metals.

In the drawings, Figure 1 represents a transverse section of my apparatus, and Fig. 2 a section from the front to the rear of the apparatus.

This apparatus is based upon the same principle as the transforming apparatus which I have described in a previous patent, differing therefrom in improvements which I have made, to better adapt it to the treatment of metals by my present invention.

The apparatus consists of a U-shaped tube, in the interior of which the cast-iron to be purified is alternately thrown from one branch into the other by the flow of air, in order to cause the chemical purifying agents to pass incessantly through the molten mass. The U-shaped tube consists of a removable crucible, A, and two columns or tubes, B, the interior of which assume a cylindrical form. The upper ends of the tubes B are provided with mouth-pieces having cocks C C, which serve either to close the columns or for the escape of the gases through a common chimney, D. The body of the apparatus is of refractory material with an outer coating of metal, and the interior lined with brick-work covered with magnesia up to about one-half the height of the columns. The apparatus rests upon four supports, J J J J, of iron or other material. A metallic platform, P, is placed at the upper level of the columns, and is accessible by an iron staircase, E. The mouth-pieces G G are shaped so as to form tanks or receivers for the cocks C C. The cocks and their tanks are of cast-iron, and are hollowed out in the interior to receive a continuous circulation of water to keep them cool. These cocks are adjusted freely upon the horizontal shaft O, which imparts to them their respective rotations by means of a lever arrangement, the clutches M M of which are actuated simultaneously or separately by forked levers under control of the workman. The shaft O receives its motion from a small cylinder, F, through the medium of a lever, I, and rod I', jointed to the piston-rod of said cylinder. This last may be actuated by steam, air, or water, the admission of which is governed by a hand-lever, L.

The introduction of the air is effected through the pipes H H, spanned upon a single tube. They are both actuated by an automatic transfer, receiving its motion from the rod I', or otherwise. They are so arranged that one pipe may be open while the other is closed, and act in such relation to the mouth-piece cocks C C in each column that the air may be alternately admitted, first to one and then to the other, the cocks opening and closing alternately to regulate the escape of the gases. Instead of the tube $h$ and pipes H, I can, for the introduction of the air, employ blast-pipes arranged at the lower portion, and similar to those used in the Bessemer process. The cast-iron to be purified, previously brought to a melted state, is poured into the apparatus through the supply-openings R R, which are closed by plugs governed by a lever, T, and a stop-key, $t$. The same arrangement for closing is applicable to the removal-orifice S. The cast-iron is not allowed to rise above two-thirds the height of the cylindrical part below the charging-holes, the charge varying from three to six tons, according to the size of the apparatus. The purifying agents are introduced into the molten metal through the holes R R, or through the open mouth-pieces C C. A workman on the ground then puts the apparatus in operation by moving the lever I so as to bring the cocks C C and the air-pipes H H into the desired position, so as to force the molten mass from one side of the U-tube to the other alternately, the cocks opening and closing alternately to allow the gas to escape at proper intervals. Fresh quantities of purifying agents may be added from time to time, and the progress of the purification may be viewed through a hole, $x$, and the exact moment for stopping may be determined. The charge of purified metal may be drawn off through the openings S.

The retort A may be removed by loosening the bolts $v\ v$, which hold the junctions, and dropped upon a carriage, Y, when it is desired to clean or repair the apparatus.

Having described my invention, what I claim is—

1. The new material, phosphoric steel, consisting of an alloy of iron and phosphorus, substantially as herein set forth.

2. The improved alloy or steel, consisting of iron, phosphorus, and manganese, as herein set forth.

3. The process of converting iron and its various ores containing a minimum quantity of phosphorus, as specified, into phosphoric iron or steel, as herein described.

4. The process of converting iron and its ores which contain a maximum quantity of phosphorus, as set forth, into phosphoric iron or steel by the employment of manganese, as described.

5. The employment of the reagents herein specified for the formation of a flux to absorb and combine with the silicium, sulphur, and other impurities of the metal, and free it from the same, as specified.

6. The combination of the alternating pipes H H with the alternating cocks C C, arranged to operate as described.

7. The removable crucible A, in combination with the tubes B B, as herein described.

8. The combination of the hollow cocks C C with the tanks G G, by which they are supplied with water, as herein described.

In testimony whereof I have signed my name to this specification before two subscribing witnesses.

C. M. TESSIÉ DU MOTAY.

Witnesses:
    J. ARMENGAUD, Jeune,
    E. STERN.